United States Patent [19]

Ishigaki et al.

[11] 4,435,006
[45] Mar. 6, 1984

[54] AUTOMATIC PRESSURIZED CONNECTING DEVICE

[75] Inventors: Katsumi Ishigaki; Kazuo Sasaki; Takumi Fukumura, all of Osaka, Japan

[73] Assignee: Kabushiki Kaisha Yamamoto Suiatsu Kogyosho, Osaka, Japan

[21] Appl. No.: 259,779

[22] Filed: May 1, 1981

[30] Foreign Application Priority Data

May 12, 1980 [JP] Japan .................... 55-65268[U]
May 27, 1980 [JP] Japan .................... 55-71224

[51] Int. Cl.³ ............................................ F16L 55/00
[52] U.S. Cl. ........................... 285/119; 29/237; 73/49.6; 138/90; 285/190; 285/265
[58] Field of Search .......... 73/49.6, 49.5; 29/237; 138/90; 285/24, 119, 190, 425, 265

[56] References Cited

U.S. PATENT DOCUMENTS

| | | | |
|---|---|---|---|
| 2,725,743 | 12/1955 | Reichl | 73/49.6 |
| 2,828,620 | 4/1958 | Franks | 73/49.6 |
| 3,179,127 | 4/1965 | Terry | 73/49.6 X |
| 3,760,632 | 9/1973 | Illyes et al. | 73/49.6 |
| 4,237,723 | 12/1980 | Kent | 73/49.6 |

*Primary Examiner*—Thomas F. Callaghan
*Attorney, Agent, or Firm*—Sughrue, Mion, Zinn, Macpeak and Seas

[57] ABSTRACT

An automatic pressurized connecting device having a wide angle of attachment and in which thermal seizure is eliminated. The device includes a main frame mounted on wheels which run on rails, a rotary shaft fitted on the main frame, a first bracket mounted on the rotary shaft, and the body rockably coupled to the first bracket. A main shaft is inserted into a central portion of the body and the high pressure water supplying rotary universal joint is coupled to a front end portion of the main shaft. A seal plug is coupled to a front end portion of the universal joint. A motor is provided on a second bracket for rotating the main shaft. A high pressure water supplying port in the body communicates with a water supplying port formed in a front end portion of the main shaft.

4 Claims, 6 Drawing Figures

AUTOMATIC PRESSURIZED CONNECTING DEVICE

BACKGROUND OF THE INVENTION

The present invention relates to an automatic pressurized connecting device. More specifically, the invention relates to a device of this type which smoothly and automatically provides threading engagement with a mating member such as a plug, a coupler or a protector (hereinafter referred to merely as "a plug" when applicable) the thread of which can extend at a random angle within a fixed range.

Heretofore, this screwing operation has been carried out manually or with the use of an Oldham's coupling mechanism. Such a screwing operation is generally inefficient. In addition, the attachment angle is limited. Accordingly, the threaded part has a tendency in many cases to suffer from thermal seizure due to an incorrect screwing direction.

If it is required to supply water under high pressure through the threaded part which is being attached in such a manner, it is impossible to use an Oldham's coupling mechanism. Thus, heretofore, water has been supplied under high pressure through the threaded part while the latter is being screwed in a certain direction irrespective of the desired screwing direction or the eccentricity.

SUMMARY OF THE INVENTION

Accordingly, an object of the invention is to eliminate the above-described difficulties of the prior art device.

The foregoing object and other objects as well as characteristic features of the invention will become more apparent from the following detailed description and the appended claims when read in conjunction with the accompanying drawings.

In accordance with this and other objects of the invention, there is provided an automatic pressurized connecting device including a main frame having wheels which are adapted to run on rails, a rotary shaft fitted in the main frame, a first bracket mounted on the rotary shaft, a body rockably coupled to the first bracket for balancing front and rear parts of the bracket and the weight supported by the bracket, a main shaft inserted through a central part of the body, a high pressure water supplying rotary universal joint coupled to a front end portion of the main shaft, a seal plug adapted to be screwed into a test pipe coupled to a front end portion of the high pressure water supplying rotary universal joint, a motor mounted on a second bracket secured to the body with the motor being coupled through a coupling to a rear end portion of the main shaft, a high pressure water supplying port of said body communicating with a water supplying port formed in a front portion of the main shaft, a third bracket and at least a pair of fourth brackets mounted on the main frame with the third bracket being secured to a support holding the rotary universal joint, and supporting cylinders secured to the fourth brackets and to the supports.

Preferably, the high pressure water supplying universal joint includes a first joint arm having a throughhole along the central axis thereof, a second joint having a throughhole along the central axis thereof, a joint ball having a throughhole in a central portion thereof, set pins coupling said joint arms to the joint ball in such a manner that the joint arms are coaxial and are arranged crosswise and the throughholes communicate with one another, seal packings disposed on contact surfaces between axial portions of the joint arm and a central portion of the joint ball and between a central portion of the joint ball and axial portions of the joint arm, respectively, with at least one of the joint arms being adapted to be coupled to a coupling pipe.

The motor may be a hydraulic pressure motor or an electric motor as desired. A chuck may be provided for coupling the high pressure water supplying rotary universal joint to the front end portion of the main shaft.

DESCRIPTION OF THE PREFERRED EMBODIMENTS

Figure 1:
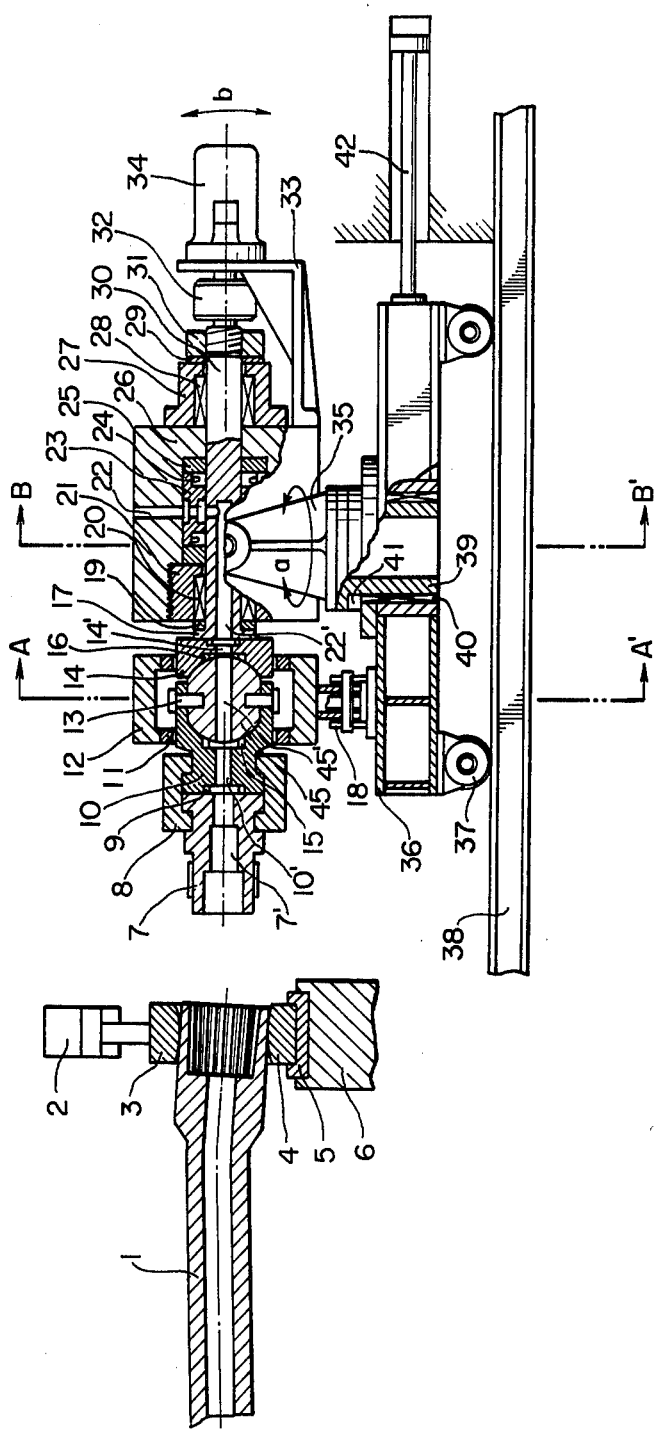
FIG. 1 is a longitudinal sectional view of a prefered embodiment of an automatic pressurized connecting device according to the invention.

Referring to FIG. 1, a test pipe 1 is positioned coaxially with an automatic pressurized connecting withstanding device using an adjusting liner 5 and a lower clamp die 4 which are fixedly mounted on a clamp frame 6. The test pipe 1 is also fixedly secured through an upper clamp die 3 by a clamping cylinder 2.

The automatic connecting device of the invention is installed on a main frame 36 which is provided with wheels 37 which runs on rails 38. The main frame 36 is moved by a running cylinder 42.

Figure 3:
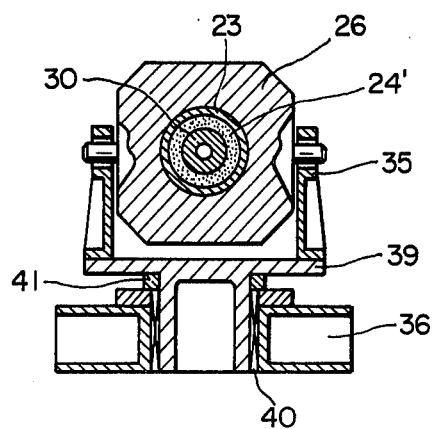
FIG. 3 is a sectional view taken along a line B—B' in FIG. 1.

A radial bearing 40 and a thrust bearing 41 are interposed between the main frame 36 and a rotary shaft 39, as shown in FIG. 3, so that the rotary shaft 39 is rotatable in the directions of the arrow a in FIG. 1. A bracket 35 is provided on the rotary shaft 39 which is rotatable similar to the rotary shaft 39. A trunnion type body 26 is supported on the bracket 35 and is rockable as indicated by the arrow b, balancing the weights of the front and rear parts.

A water supplying port 22 is formed in the body 26 and a main shaft 30 passes through the body 26. A thrust bearing 19 and a radial bearing 20 are mounted on the main shaft with a nut 21, a radial bearing 28 is mounted on the main shaft with a bearing 27, and a thrust bearing 29 is mounted on the main shaft with a nut 31, so that the main shaft is readily rotatable.

A drive source for rotating the main shaft is provided as a hydraulic pressure water 34 mounted on a bracket 33 which is secured to the body 26. The motor 34 may be replaced by an electric motor or a different drive source. The torque of the motor 34 is transmitted through a coupling 32 to the main shaft.

The main shaft 30 has a water supplying port 22' extending along the central axis thereof. In order to supply water even during rotation of the main shaft 30, the water supplying port 22' is communicated with the water supplying port 22 in the body 26 through a spacer 25, seal packings 24 and 24' and a packing support 23 provided in the body 26. The front end portion of the main shaft 30 is coupled to the rear end of a joint arm 14.

The water supplying port 22' in the main shaft 30 is coupled through a seal packing 17 to a throughhole 14' in the joint arm 14. The joint arm 14 is connected to a joint ball 45, having a throughhole 45' serving as a water supplying port, with coupling pins 13, 13' and while a joint arm 10, having a throughhole 10' serving as a water supplying port, is connected to the joint ball with coupling pins 13, 13' in such a manner that the two joint arms are coaxial, are arranged crosswise and are freely rotatable.

In accordance with the invention, a coupling composed of the joint arm 10, the joint ball 45 and the joint arm 14 which have the throughholes 10', 45' and 14' in the central portions, respectively, and are assembled coaxially and crosswise with the coupling pins 13 and 13' will be referred to as "a rotary universal joint".

The contact surfaces between the water supplying ports (between the throughholes 10' and 45' and between the throughholes 45' and 14') are sealed with seal packings 15 and 16, respectively. The rotary universal joint is rotatable freely to an extent such that the contact surfaces are maintained sealed and can supply water under high pressure. A seal plug 7 which is to be screwed into the test pipe 1 is secured to the front end portion of the joint arm 10 of the rotary universal joint with a chuck 8. A seal packing 9 is interposed between the throughholes 10' of the joint arm 10 and the seal plug 7 so that no water can leak out.

The pressurized connecting device of the invention is constructed as described above. With this construction, as the drive source, namely, the hydraulic pressure motor 34, is turned in the direction of the arrow b, the torque of the motor 34 is transmitted through the coupling 32, the main shaft 30 and the rotary universal joint to the plug 7 to rotate the latter.

During rotation, high pressure water which is supplied through the water supplying port 22 in the body 26 is delivered through the water supplying port 22' and the throughholes 14', 45' and 10' into the throughhole 7' of the plug 7 and finally the test pipe 1.

Figure 2:
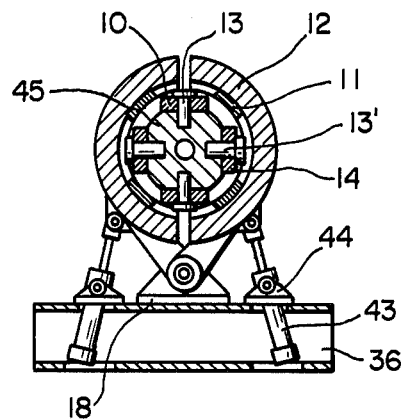
FIG. 2 is a sectional view taken along a line A—A' in FIG. 1.

The rotary universal joint has a tendency to be deflected downwardly by its own weight. In order to prevent such deflection, a bracket is mounted on the main frame 36 is secured to a support 12 which is made up of two parts to hold the rotary universal joint, the two parts being openable horizontally with supporting cylinders 45 as shown in FIGS. 1 and 2. The supporting cylinders 43 are mounted on a bracket 44 on the main frame 36 and are coupled to the support 12. Centering support liners 11 are provided on the inner wall of the support 12 as shown in FIG. 2.

Figure 5:
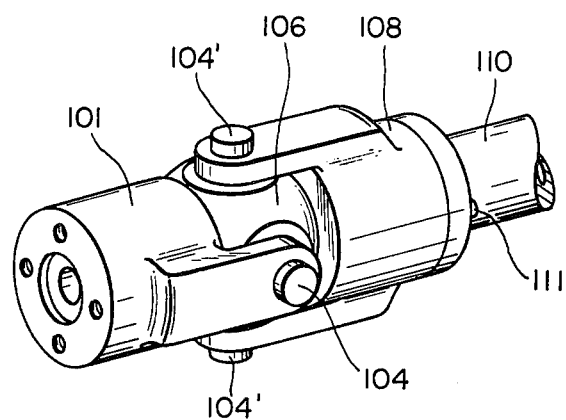
FIGS. 5 and 6 are a perspective view and a sectional view of a rotary universal joint, respectively, which is employed in the device of the invention.
Figure 6:
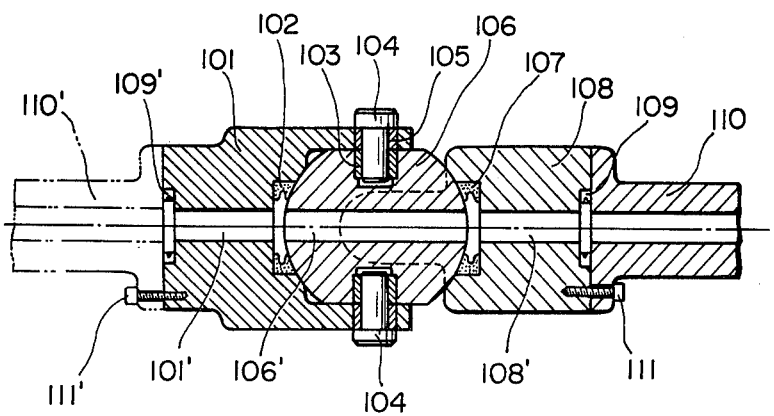

The high pressure water supplying rotary universal joint will be described with reference to FIGS. 5 and 6 in more detail. FIG. 5 is a perspective view of the rotary universal joint and FIG. 6 is a sectional view of the same. In FIGS. 5 and 6, reference numeral 101 designates a joint arm having a throughhole 101' along the central axis for supplying a high pressure solution, 106 a joint ball having a throughhole 106 in the central portion for supplying a high pressure solution, and 108, a joint arm having a throughhole 108' along the central axis for supplying a high pressure solution.

The contact surfaces between the joint arm 101 and the joint ball of 106 and between the joint ball 106 and the joint arm 108 are made spherical so that the joint arms 101 and 108 are in close contact withe the joint ball 106. The contact surfaces are sealed with seal packing 102 and 107, respectively, described below.

The inlet arms 101 and 108 are coupled to the joint ball 106 with set pins 104 and 104 and set pins 104' and 104', respectively, in such a manner that the joint arms are coaxial and are arranged crosswise as shown in FIGS. 5 and 6. A bearing 103 and a bushing 105 are provided for each of the set pins 104 and 104' so that the set pins 104 and 104' can rotate smoothly.

In FIGS. 5 and 6, reference numerals 102 and 107 designate spherical sealing packings. The sealing packing 102 is provided on the contact surface between the joint arm 101 and the joint ball 106 so that no solution can leak out. Similarly, the sealing packing 107 is provided on the contact surface between the joint arm 108 and the joint ball 106 so that no solution can leak out.

The rocking angle can be selected freely in a range which is defined by the inside diameter of the seal packings 102 and 107 and the diameter of the throughhole 106' of the joint ball 106.

A coupling pipe 110 is secured to the jooint arm 108 with bolts 111. A seal packing 109 is interposed between the joint arm 108 and the coupling pipe 110. Similarly, a coupling pipe 110' is secured through a seal packing 109' to the joint arm 101 with bolts 111'. With the high pressure water supplying rotary universal joint constructed as described above, the coupling pipe 110 can transmit universal rotation to the coupling pipe 110' and vice versa.

In the high pressure water supplying rotary universal joint, the joint arms 101 and 108 are coupled to the joint ball 106. In such a manner that they are coaxial and arranged crosswise as described above. That is, the rotary universal joint can transmit torque even if the joint arms form an angle. Therefore, when the coupling pipes 110 and 110' are connected to the rotary universal joint, while the pipes 110 and 110' and the rotary universal joint are rotated as one unit at a high speed transmitting a large torque, the solution can be delevered under high pressure through the throughholes 101', 106' and 108'.

In operation, first the test pipe 1 is fixedly secured by a clamping mechanism composed of the clamping cylinder 2, the upper clamp die 3, the lower clamp die 4, the adjusting liner 5 and the clamp frame 6.

The automatic pressurized connecting device is then moved forward by the running cylinder 42 to insert a portion of the head of the seal plug 7 into the test pipe 1.

In this case, the support 12 holding the rotary universal joint is opened by the supporting cylinders 43 horizontally (FIG. 2) so as to set the rotary universal joint free.

Next, while the seal plug 7 is being rotated by the hydraulic pressure motor 34 as described above, the device is moved forward by the running cylinder 42 to cause the seal plug to threadably engage with the test pipe 1.

Figure 4:
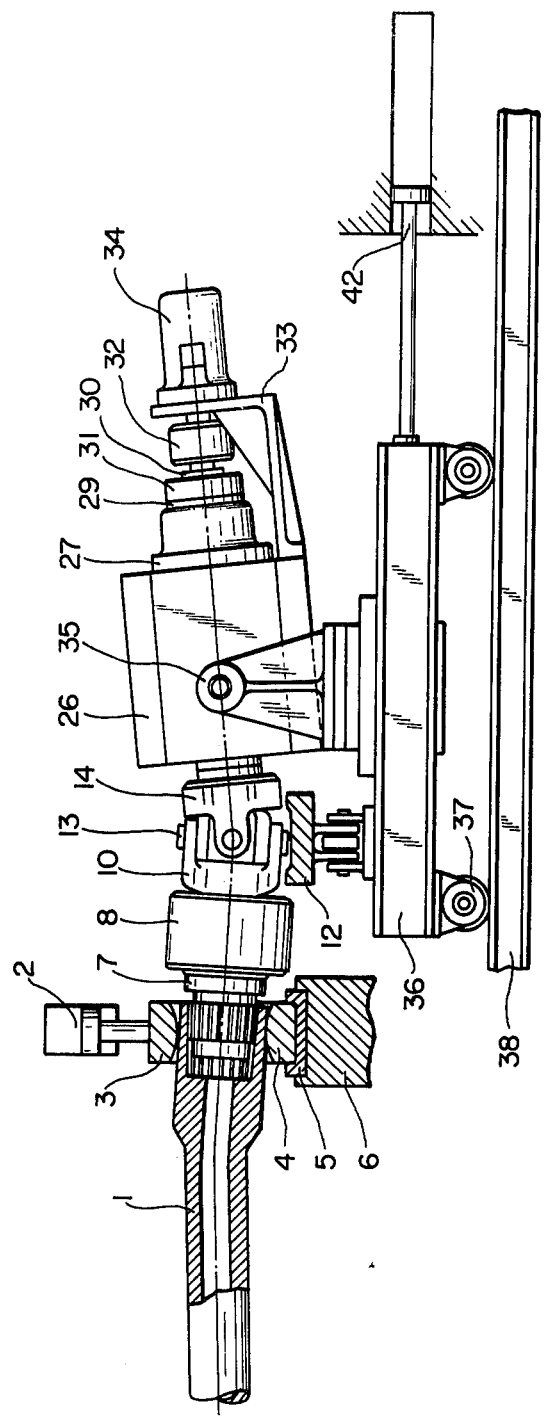
FIG. 4 is an explanatory diagram, partly as a sectional view, for a description of the operation of the device of the invention.

If, in this operation, the female thread of the test pipe 1 is not aligned with the male thread of the seal plug 7, then the rotary sections which are provided in the rotary universal joint and the body 26 (corresponding to the rotation indicated by the arrow a and the rocking motion indicated by the arrow b in FIG. 1) operate as illustrated in FIG. 4 to screw the seal plug 7 into the test pipe 1. Under this condition, a pressure withstanding test can be carried out for the test pipe by supplying water under high pressure through the water supplying port 22 in the body 26.

As is apparent from the above description, the automatic pressurized connecting device of the invention can automatically screw a plug or the like into a test pipe more efficiently than than conventional device and can deliver water under high pressure while the plug is being rotated.

What is claimed is:

1. An automatic pressurized connecting device comprising:
   a main frame with wheels adapted to run on rails;
   a rotary shaft fitted in said main frame;
   a first bracket mounted on said rotary shaft;
   a body rockably coupled to said first bracket for balancing weights of front and rear parts of said bracket;
   a main shaft inserted into a central portion of said body;
   a high pressure water supplying rotary universal joint coupled to a front end portion of said main shaft;
   a seal plug adapted to be screwed into a test pipe coupled to a front end portion of said high pressure water supplying rotary universal joint;
   a motor mounted on a second bracket secured to said body, said motor being coupled through a coupling to a rear end portion of said main shaft;
   said body having a high pressure water supplying port communicating with a water supplying port formed in a front portion of said main shaft;
   a third bracket and at least a pair of fourth brackets mounted on said main frame, said third bracket being secured to a support holding said rotary universal joint; and
   supporting cylinders secured to said fourth brackets and to said support.

2. The device as claimed in claim 1 in which said high pressure water supplying rotary universal joint comprises:
   a first joint arm having a throughhole along the central axis thereof;
   a second joint arm having a throughhole along the central axis thereof;
   a joint ball having a throughhole in a central portion thereof;
   pins coupling said joint arms to said joint ball in such a manner that said joint arms are coaxial and are arranged crosswise and said throughholes communicate with one another;
   seal packings disposed on contact surfaces between axial portions of said joint arm and a central portion of said joint ball and between a central portion of said joint ball and axial portions of said joint arm, respectively, at least one of said joint arm being adapted to be coupled to a coupling pipe.

3. The device as claimed in claim 1 wherein said motor comprises a hydraulic pressure motor.

4. The device as claimed in claim 2 further comprising a chuck for coupling said high pressure water supplying rotary universal joint to said front end portion of said main shaft.

* * * * *